United States Patent Office 2,961,322
Patented Nov. 22, 1960

2,961,322

METHOD OF PRESERVING PERISHABLE FOODSTUFFS

Alexander Winterberg, Ramat Shaul, Haifa, Israel

No Drawing. Filed Feb. 1, 1957, Ser. No. 637,619

4 Claims. (Cl. 99—166)

It is already known to provide perishable goods such as comestibles, e.g. meats and cheese, with an enveloping wrapping composed of one or more layers, which wrapping fully and tightly encloses the goods in question. Such wrappings are produced directly on the goods to be packed and consist of plastic masses applied as emulsions to the said goods.

It is already known to prepare the individual layers in such a manner that they either permit a breathing of the goods or prevent it—according to the nature of the goods being packed. There has been no possibility of making a wrapping of the kind referred to which first permits a breathing of the goods and which wrapping is subsequently rendered tight so as to prevent breathing. The best wrappings of this kind are films of artificial resins, which material is applied in a thin layer of a viscous emulsion on the articles to be packed. Recently such films were obtained by using polyvinyl acetate; this substance was employed in cases where it seemed desirable to permit a breathing of the goods. Where an airtight packing was requested, so as to prevent breathing of the goods, the wrappings were made using therefor polyvinylchloride, vinylidenchloride or acrylic derivates.

It is known to admix to these substances appropriate emulsifiers, stabilizers and plasticizers. It is further known to add to the emulsions which are applied to the articles to be packed certain fillers, such as hemicellulose, starch and the like, so as to give the film the desired strength, porosity, and also in order to control the transparency or opacity of the film.

Experience has shown that a film of polyvinyl acetate is affected by water to a high degree, which becomes particularly inconvenient in cases where the goods themselves contain a high degree of moisture and have also to be stored in moist rooms. So for instance freshly manufactured cheese has to be packed, but the loaves are stored for ripening for a certain period. The loaves of cheese are very moist and they are stored in rooms where the relative humidity is very high, i.e. above 90%. In such cases polyvinyl acetate films do not dry easily, and such films containing also moisture affected fillers do not dry at all. In cases where drying proceeded to a certain degree the loaves became sticky on the outside due to moisture acting from their inside, and the film became moist and opaque. In such cases the goods stuck to each other and to the supports on which they rested, the films were spoiled and torn—the so packed goods were not fit for sale anymore. But apart from these disadvantages, drying proceeds very slowly, which is most inconvenient with meat products such as sausages and the like, since in the nature of things such goods have to be sent out of the manufacturing plant immediately after having been produced.

In rooms where the relative humidity is above 90% the use of polyvinyl acetate films is thus practically impossible. Colloidal changes in the polyvinyl acetate film due to moisture thus prevent the proper functioning of wrappings of this kind and eventually the quality of the goods so packed is impaired. No satisfactory solution of this problem has been found till now.

It is an object of the present invention to remove the above disadvantages and to provide a mass from which films of the kind referred to can be prepared, which films dry quickly and are not affected by moisture.

According to the invention to the known and commonly used artificial resins is admixed an emulsion of a wax or waxes which are capable of absorbing water. The property of absorbing water from their surroundings is possessed by all hydrophilic waxes such as are used in the preparation of cosmetic creams. In the preparation of a mass for the making of a film for the purpose referred to above, and using therein a mixture of known artificial resins with one or more of the said waxes, no fillers as heretofore employed are any more necessary. Practically, one proceeds in such a manner that from one of the known plastics and an appropriate wax such as lanette wax or bees wax or another wax on the basis of stearin alcohol or stearin ester or a mixture thereof, there is prepared an emulsion capable of being applied to goods by dipping, or spraying, or brushing on, and this emulsion is applied to the goods in a thin layer. While drying the said thin layer produced on the surface of the goods to be packed, owing to the hydrophilic wax contained therein, absorbs moisture from the goods (to an extent as such moisture cannot escape through the pores of the film) while at the same time the water content of the plastic emulsion is absorbed. The absorption of moisture by and into the wax components of the films does not impair in any way the pleasing appearance of the wrapping. The goods themselves are not affected in any way and for this reason this method of packing is particularly suitable for high priced comestibles, such as better quality meat or fine cheese which in the new packing can be offered to the consumer, without any likelihood of becoming spoiled or losing its pleasant appearance.

By employing the combination of plastics with waxes, as indicated above, the disadvantages of an emulsion of polyvinyl acetate are fully removed:

(1) The film is not more affected by moisture and does not change its properties under continued influence of moisture; color, appearance, and surface conditions of the film remain constant.

(2) Drying proceeds quickly and, according to the technical arrangements, takes from 3 minutes to half an hour as compared with 3–24 hours previously.

(3) The films dry even in very humid surroundings up to relative humidity of 90%.

In certain cases it is necessary to pack the goods in such a manner that breathing of the packed substances is immediately stopped. In other cases breathing should continue for a certain period and should then be reduced to a certain extent or should be stopped altogether. The first is the case with certain meat products such as hard sausages which are to be stored for a continued period. The latter is the case with cheese, where for a certain period breathing is to continue in view of maturing of the cheese, whereupon it is to be stopped. It is only with the application of the new method that said effects can be reached.

With cheese where a ripening is required, the film is applied in the known manner, the loaves of cheese are stored for ripening and after the conclusion of this period—between 6 weeks and 3 months—the packed loaves are exposed to an increased temperature—up to 60° C.—or up to the melting point of the wax used. In consequence of this heat treatment the wax particles melt and envelop the plastic particles, thereby entirely closing the pores of the covering layer. Thus this layer of film becomes impermeable to air, vapor or gas and further breathing of the cheese is prevented. In the case of sausages and other meat products the covering layer is applied by dipping the meat in the emulsion, in the cold; drying occurs at normal room temperature without application of heat, but possibly with agitation of the surrounding air. In this manner the goods so packed are allowed continued breathing. With many meat products the film immediately after drying, is exposed to heat for a short time in order to melt the wax and hermetically close its pores. It is only with some kinds of sausages that a ripening or curing period of 2–3 weeks is allowed, with exposure to heat only afterwards. On the other hand there are certain delicate meat products which must not be exposed to heat at all. In such cases a combined emulsion of vinylidenchloride and wax is employed.

It is not absolutely necessary to apply the covering layer in a known manner directly to the goods to be packed; some intermediate carrier may be employed. Thus it would be within the scope of the invention to produce a film or layer on sheet material such as paper or a fabric in order to use this material for wrapping. It would also be within the scope of the invention to apply the film to plastic foils or metal foils such as aluminium foils which can then be used for wrapping of the foodstuffs. In this way all the advantages of a metal foil wrapping or a plastic sheet wrapping are combined with the advantages of the new product.

The following examples illustrate the manner in which the new invention is being carried into practice:

*Preparation of basic emulsion*

(A) (Polyvinyl acetate emulsion):
88 parts by weight of polyvinyl acetate of 60% dry substance
12 parts by weight of a non toxic plasticizer (B) (Wax emulsion):
33 parts by weight of a hydrophilic wax
67 parts by weight of water

*Preparation of the mass for a covering layer permitting breathing*

(I) 60 parts by weight of emulsion A
25 parts by weight of emulsion B
14 parts by weight of water
1 part silicone antifoaming substance (II) 50 parts by weight of emulsion A
30 parts by weight of emulsion B
19 parts by weight of water
1 part silicone antifoaming substance The masses obtained in accordance with Examples I and II are well suited, owing to their viscosity, for such cases where the covering layer is to be applied by being brushed onto the goods to be packed and where a dripping from the still wet covered goods is to be avoided. This is the case for instance in the manufacture of cheese.

(III) 40 parts by weight of emulsion A
20 parts by weight of emulsion B
39 parts by weight of water
1 part silicone antifoaming substance (IV) 40 parts by weight of emulsion A
25 parts by weight of emulsion B
34 parts by weight of water
1 part silicone antifoaming substance The masses prepared in accordance with Examples III and IV are less viscous and are suited for such cases where the covering layer is to be produced by dipping or spraying on, e.g. in the manufacture of sausages and meat products.

(V) 60 parts by weight of emulsion A
10 parts by weight of emulsion B
29 parts by weight of water
1 part silicone antifoaming substance A film prepared from a mass according to Example V will never close hermetically. The wax contents is just sufficient to counteract the sensibility of polyvinyl against moisture and to act as an accelerator in the drying. For this reason such a covering layer is particularly suited for fruit and like commodities which should not be enclosed hermetically.

*Preparation of hermetically closing films*

(VI) 45 parts by weight of polyvinylidenchloride
25 parts by weight of emulsion B
28 parts by weight of water
2 parts silicone antifoaming substance (VII) 45 parts by weight of a mixed polymer vinylchloride and acrylic nitrile
25 parts by weight of emulsion B
28 parts by weight of water
2 parts silicone antifoaming substance The masses according to Examples VI and VII are well suited for the preparation of a layer on paper, cardboard or the like so as to render these latter water and vapour impermeable. When such a mass is applied to plastic foils it fully closes the pores thereof and renders it gas tight. The masses are also suited for application to metal foils. These masses may be applied by spraying or brushing or may be transferred by means of rollers. The layer applied to sheets is dried in a drying tunnel, for the half of the stretch thereof by cold air and its second half by hot air. By the latter treatment the layer is made air and gas tight.

(VIII)
40–60 parts by weight of polyvinylidenchloride
20–40 parts by weight of emulsion B
18 parts by weight of water
2 parts silicone antifoaming substance The mass according to Example VIII, the viscosity of which can be adjusted within the limits of the given proportions, is suited for preparing a hermetically closing covering layer on articles of food which should not be exposed to heat. This mass may be applied by brushing, dipping or spraying. Moreover, this mass can be used as a top layer to be applied on layers according to Examples VI and VII.

Others may readily adapt the invention for use under various conditions of service by employing one or more of the novel features disclosed or equivalents thereof. As at present advised, with respect to the apparent scope of my invention, I desire to claim the following subject matter.

I claim:

1. A method for preserving food materials of the type that should be allowed to breathe and ripen in their container which comprises coating a mass of said food material with a coating containing a non-toxic, polyvinyl acetate resin and a hydrophilic wax, the ratio of said resin to said wax being from about 4¼ up to about 16, drying the coated mass until pores are formed in the coating to permit the coated food material to breathe; and, subsequently, after ripening the food, raising the temperature of the coating to fuse the wax and render the coating impervious to gas and moisture.

2. A food package comprising a mass of food material of the type that should be allowed to breathe and ripen in its container and a coating on said mass comprising a homogeneous layer of an emulsion, said emulsion containing an emulsified polyvinyl acetate resin and an emulsified hydrophilic wax, the ratio of said resin to said wax being from about 4¼ up to about 16, said coating, as initially applied, and subsequently dried, being pervious to gases and moisture, thereby permitting breathing and ripening of said coated mass of food material.

3. A food package comprising a mass of food material of the type that should be allowed to breathe and ripen in its container and a coating having pores therein on said mass comprising a homogeneous layer of an emulsion, said emulsion containing an emulsified polyvinyl acetate resin and an emulsified hydrophilic wax, the ratio of said resin to said wax being from about 4¼ up to about 6¾, said coating, as initially applied and dried at a temperature below the melting point of said wax, being pervious to gases and moisture thereby permitting breathing and ripening of said coated mass of food material, said coating being adapted to be completely sealed after ripening said coated food material by heating to melt said wax to seal the pores in said resin.

4. A food package comprising a mass of food material of the type that should be allowed to breathe and ripen in its container and a coating on said mass comprising a homogeneous layer of an emulsion, said emulsion containing an emulsified polyvinyl acetate resin and an emulsified hydrophilic wax, the ratio of said resin to said wax being from about 8 up to about 16, said coating being pervious to gases and moisture thereby permitting breathing and ripening of said coated mass of food material.

References Cited in the file of this patent

UNITED STATES PATENTS

| | | |
|---|---|---|
| 1,407,400 | Ferrari | Feb. 21, 1922 |
| 2,021,947 | Schopp | Nov. 26, 1935 |
| 2,329,470 | Ingle et al. | Sept. 14, 1943 |
| 2,337,666 | Koonz et al. | Dec. 28, 1943 |
| 2,346,755 | Hemming | Apr. 18, 1944 |
| 2,354,574 | Carson | July 25, 1944 |
| 2,556,278 | Irvine | June 13, 1951 |
| 2,606,120 | Cherepow et al. | Aug. 5, 1952 |
| 2,640,040 | Lehman | May 26, 1953 |
| 2,671,731 | Vogt | Mar. 9, 1954 |
| 2,700,025 | Cothran | Jan. 18, 1955 |
| 2,733,151 | Zuercher | Jan. 31, 1956 |
| 2,812,259 | Mark | Nov. 5, 1957 |